(12) United States Patent
Fran et al.

(10) Patent No.: US 8,305,735 B2
(45) Date of Patent: Nov. 6, 2012

(54) STACKED SOLID ELECTROLYTIC CAPACITOR WITH MULTI-PIN STRUCTURE

(75) Inventors: Yui-Shin Fran, Hsinchu (TW); Ching-Feng Lin, Zhudong Township, Hsinchu County (TW); Chi-Hao Chiu, Hsinchu (TW); Chun-Chia Huang, Xinying (TW); Wen-Yen Huang, Yangmei Township, Taoyuan County (TW)

(73) Assignee: Apaq Technology Co., Ltd., Jhunan Township (TW)

( * ) Notice: Subject to any disclaimer, the term of this patent is extended or adjusted under 35 U.S.C. 154(b) by 296 days.

(21) Appl. No.: 12/627,576

(22) Filed: Nov. 30, 2009

(65) Prior Publication Data

US 2011/0007451 A1    Jan. 13, 2011

(30) Foreign Application Priority Data

Jul. 8, 2009    (TW) ................................. 98123042 A (51) Int. Cl.
  *H01G 4/228*    (2006.01)
  *H01G 5/38*    (2006.01)
  *H01G 9/00*    (2006.01)
(52) U.S. Cl. ...... 361/540; 361/523; 361/541; 361/306.1
(58) Field of Classification Search .................. 361/523, 361/541, 303, 301.4, 306.1, 306.3, 540
See application file for complete search history.

(56) References Cited

U.S. PATENT DOCUMENTS

| | | | | |
|---|---|---|---|---|
| 6,954,351 | B2 * | 10/2005 | Konuma et al. ............... | 361/523 |
| 7,417,844 | B2 * | 8/2008 | Ishizuka et al. ............ | 361/301.4 |
| 2002/0015277 | A1 * | 2/2002 | Nitoh et al. .................... | 361/523 |

* cited by examiner

*Primary Examiner* — Eric Thomas
*Assistant Examiner* — Arun Ramaswamy
(74) *Attorney, Agent, or Firm* — C. G. Mersereau; Nikolai & Mersereau, P.A.

(57) ABSTRACT

A stacked solid electrolytic capacitor with positive multi-pin structure includes a plurality of capacitor units, a substrate unit and a package unit. The positive electrode of each capacitor unit has a positive pin extended outwards therefrom. The positive pins are divided into a plurality of positive pin units that are separated from each other and electrically stacked onto each other. The negative electrode of each capacitor unit has a negative pin extended outwards therefrom. The negative pins are divided into a plurality of negative pin units. The negative pin units are separated from each other and the negative pins of each negative pin unit are electrically stacked onto each other. The substrate unit has a positive guiding substrate electrically connected to the positive pins and a negative guiding substrate electrically connected to the negative pins. The package unit covers the capacitor units and one part of the substrate unit.

10 Claims, 8 Drawing Sheets

STACKED SOLID ELECTROLYTIC CAPACITOR WITH MULTI-PIN STRUCTURE

BACKGROUND OF THE INVENTION

1. Field of the Invention

The present invention relates to a stacked solid electrolytic capacitor, in particular, to a stacked solid electrolytic capacitor with multi-pin structure.

2. Description of Related Art

Various applications of capacitors include home appliances, computer motherboards and peripherals, power supplies, communication products and automobiles. The capacitors are mainly used to provide filtering, bypassing, rectifying, coupling, blocking or transforming function, which play an important role in the electric and electronic products. There are different capacitors, such as aluminum electrolytic capacitors, tantalum electrolytic capacitors or laminated ceramic capacitors, in different utilization.

A typical aluminum electrolytic capacitor includes an anode foil and a cathode foil processed by surface-enlargement and/or formation treatments. The surface-enlargement treatment is performed by etching a high purity aluminum foil to increase its surface area so that a high capacitor can be obtained to achieve miniaturized electrolytic capacitor. The anode aluminum foil is then subjected to the formation treatment to form a dielectric surface film. A thickness of the dielectric film is related to a supply voltage of the electrolytic capacitor. Normally the cathode foil will be subjected to the formation treatment, too. However, if no formation treatment on the cathode foil, an oxide film layer will be still formed on the surface when exposed in the air. After cutting to a specific size according to design spec., a laminate made up of the anode foil, the cathode foil which is opposed to the dielectric film of the anode foil and has etched surfaces, and a separator interposed between the anode and cathode foils, is wound to provide an element. The wound element does not have any electric characteristic of the electrolytic capacitor yet until completely dipped in an electrolytic solution for driving and housed in a metallic sheathed package in cylindrical form with a closed-end equipping a releaser. Furthermore, a sealing member made of elastic rubber is inserted into an open-end section of the sheathed package, and the open-end section of the sheathed package is sealed by drawing, whereby an aluminum electrolytic capacitor is constituted.

In fact, the electrolytic capacitor utilizes the mobility of ions in the electrolytic solution to obtain an electric circuit; therefore, the electrical conductivity of the electrolytic solution is an important factor for deciding performance of the electrolytic capacitor. Such that, it is an issue for how to promote the electrical conductivity of the electrolytic solution to maintain the electrolytic capacitor with high-temperature stability on the solution, the aluminum foils, the separator and etc., especially the stability of the solution and the aluminum foils. A typical electrolytic solution for a conventional electrolytic capacitor, especially for those electrolytic capacitors work on a supply voltage under 100V, includes water, organic solvent, organic acid, inorganic acid and some special additives mixed in different proportions.

Moreover, because solid electrolytic capacitor has the advantages of small size, large capacitor and good frequency characteristic, it can be used as a decoupling element in the power circuit of a central processing unit (CPU). In general, a plurality of capacitor elements is stacked together to form a solid electrolytic capacitor with a high capacitor. In addition, the solid electrolytic capacitor of the prior art includes a plurality of capacitor elements and a lead frame. Each capacitor element includes an anode part, a cathode part and an insulating part. The insulating part electrically insulates the anode part and the cathode part from each other. More specifically, the cathode parts of the capacitor elements are stacked over one another. Furthermore, conductive layers are disposed between adjacent capacitor elements so that the capacitor elements are electrically connected to one another.

Furthermore, the winding capacitor includes a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal.

SUMMARY OF THE INVENTION

In view of the aforementioned issues, the present invention provides a stacked solid electrolytic capacitor with multi-pin structure. The stacked solid electrolytic capacitor of the present invention has the following advantages:

1. Large area, large capacity, low profile and low cost.
2. The LC (Leakage Current) and the phenomenon of the short circuit are decreased.
3. The soldering difficulty and the ESR (Equivalent Series Resistance) are decreased.

To achieve the above-mentioned objectives, the present invention provides a stacked solid electrolytic capacitor with multi-pin structure, including: a plurality of capacitor units, a substrate unit and a package unit. Each capacitor unit has a positive electrode that has a positive pin extended outwards therefrom, the positive pins of the capacitor units are divided into a plurality of positive pin units that are separated from each other, and the positive pins of each positive pin unit are electrically stacked onto each other. Each capacitor unit has a negative electrode that has a negative pin extended outwards therefrom, and the negative pins of the capacitor units are combined to form a negative pin unit or divided into a plurality of negative pin units. Whereby when the negative pins of the capacitor units are divided into the negative pin units, the negative pin units are separated from each other and the negative pins of each negative pin unit are electrically stacked onto each other. The substrate unit has a positive guiding substrate electrically connected to the positive pins of the capacitor units and a negative guiding substrate electrically connected to the negative pins of the capacitor units. The package unit covers the capacitor units and one part of the substrate unit.

To achieve the above-mentioned objectives, the present invention provides a stacked solid electrolytic capacitor with multi-pin structure, including: a capacitor unit, a substrate unit and a package unit. The capacitor unit has a plurality of positive electrodes and a plurality of negative electrodes. Each positive electrode has a positive pin extended outwards therefrom, the positive pins of the capacitor units are divided into a plurality of positive pin units that are separated from each other, the positive pins of each positive pin unit are electrically stacked onto each other, each negative electrode has a negative pin extended outwards therefrom, and the negative pins of the capacitor units are combined to form a negative pin unit or divided into a plurality of negative pin units. Whereby when the negative pins are divided into the negative pin units, the negative pin units are separated from each other and the negative pins of each negative pin unit are electrically stacked onto each other. The substrate unit has a positive guiding substrate electrically connected to the positive pins of the capacitor units and a negative guiding substrate electrically connected to the negative pins of the capacitor units. The package unit covers the capacitor units and one part of the substrate unit.

Therefore, the present invention has a plurality of positive pins being extended from the positive electrodes of the capacitor units along the same direction and/or different directions and being electrically stacked onto each other by soldering, so that the soldering difficulty and the ESR (Equivalent Series Resistance) are decreased.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
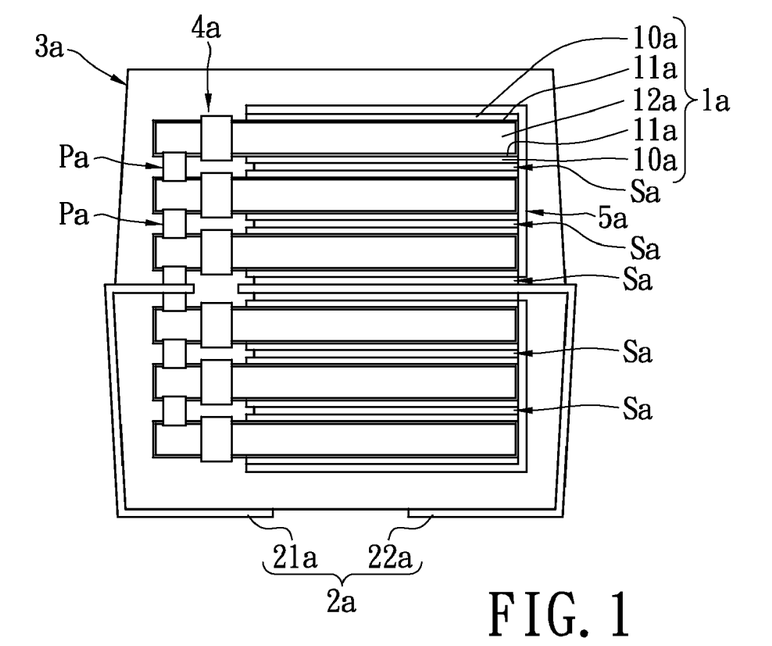
FIG. 1 is a lateral, schematic view of the stacked solid electrolytic capacitor according to the first embodiment of the present invention.

Referring to FIG. 1, the first embodiment of the present invention provides a stacked solid electrolytic capacitor (chip capacitor) with multi-pin structure, including: a plurality of capacitor units 1a, a substrate unit 2a and a package unit 3a. Every two capacitor units 1a are electrically stacked onto each other by a conductive layer Sa such as silver glue or silver paste.

Each capacitor unit 1a is composed of a carbon glue layer (negative electrode) 10a, a conductive polymer layer 11a, a valve metal foil (positive electrode) 12a, a conductive polymer layer 11a and a carbon glue layer (negative electrode) 11a that are stacked onto each other in sequence. Each valve metal foil 12a has an oxide layer (not shown) on its outer surface, and the oxide layer can be a dielectric layer to generate insulation effect. The two conductive polymer layers 11a of each capacitor unit 1a are formed on two opposite surface of the corresponding valve metal foil 12a. In addition, the first embodiment further includes a plurality of conductive layers 5a, and the carbon glue layers 10a of each capacitor unit 1a are electrically connected to each other by each conductive layer 5a.

Moreover, the positive electrodes of the valve metal foils 12a of the capacitor units 1a are electrically connected to each other by soldering Pa. The carbon glue layers 10a of each capacitor unit 1a are electrically connected to each other by the conductive layer 5a, and the valve metal foils 12a and the carbon glue layers 10a are insulated from each other. In addition, each capacitor unit 1a has a plurality of insulating layers 4a, and each insulating layer 4a is disposed around one part of an external surface of each valve metal foil 12a in order to limit the lengths of the conductive polymer layers 11a and the carbon glue layers 10a. In other words, each insulating layer 4a is disposed around one part of a top, a bottom, a left and a right surfaces of each valve metal foil 12a. Each insulating layer 4a can be an insulating line between the positive electrode and the negative electrode of the each capacitor unit 1a.

Furthermore, the substrate unit 2a has a positive guiding substrate 21a electrically connected to the valve metal foils 12a of the capacitor units 1a and a negative guiding substrate 22a electrically connected to the carbon glue layers 10a of the capacitor units 1a. In addition, the package unit 3a covers the capacitor units 1a and one part of the substrate unit 2a.

Figure 2:
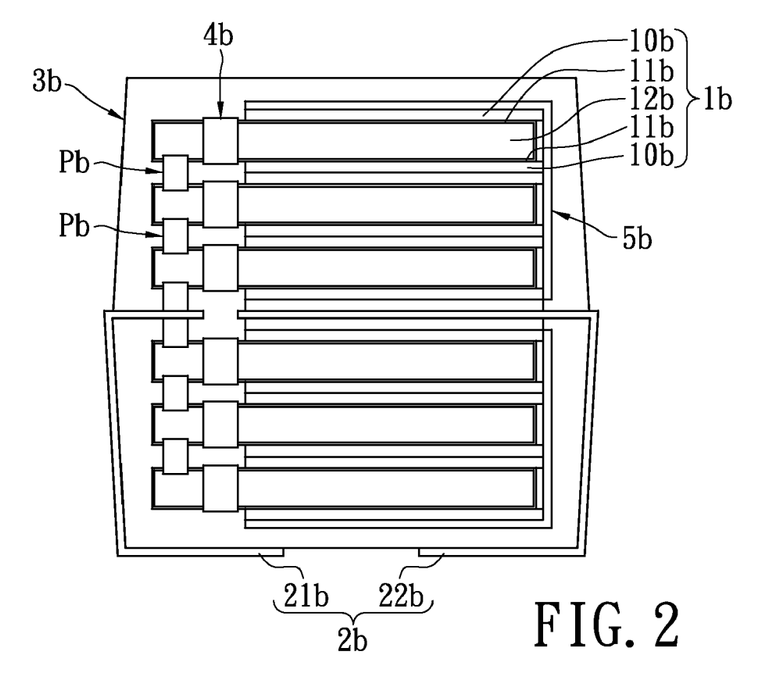
FIG. 2 is a lateral, schematic view of the stacked solid electrolytic capacitor according to the second embodiment of the present invention.

In addition, referring to FIG. 2, the second embodiment of the present invention provides a stacked solid electrolytic capacitor (chip capacitor) with multi-pin structure, including: a plurality of capacitor units 1b, a substrate unit 2b and a package unit 3b. Each capacitor unit 1b is composed of a carbon glue layer (negative electrode) 10b, a conductive polymer layer 11b, a valve metal foil (positive electrode) 12b, a conductive polymer layer 11b and a carbon glue layer (negative electrode) 11b that are stacked onto each other in sequence. Each valve metal foil 12b has an oxide layer (not shown) on its outer surface, and the oxide layer can be a dielectric layer to generate insulation effect. The two conductive polymer layers 11b of each capacitor unit 1b are formed on two opposite surface of the corresponding valve metal foil 12b. Every two capacitor units 1b are electrically connected to each other by the carbon glue layer 10b. In addition, the second embodiment further includes a plurality of conductive layers 5b, and the carbon glue layers 10b of each capacitor unit 1b are electrically connected to each other by each the conductive layer 5b.

Moreover, the positive electrodes of the valve metal foils 12b of the capacitor units 1b are electrically connected to each other by soldering Pb. The carbon glue layers 10b of each capacitor unit 1b are electrically connected to each other by the conductive layer 5b, and the valve metal foils 12b and the carbon glue layers 10b are insulated from each other. In addition, each capacitor unit 1b has a plurality of insulating layers 4b, and each insulating layer 4b is disposed around one part of an external surface of each valve metal foil 12b in order to limit the lengths of the conductive polymer layers 11b and the carbon glue layers 10b. In other words, each insulating layer 4b is disposed around one part of a top, a bottom, a left and a right surfaces of each valve metal foil 12b. Each insulating layer 4b can be an insulating line between the positive electrode and the negative electrode of the each capacitor unit 1b.

Furthermore, the substrate unit 2b has a positive guiding substrate 21b electrically connected to the valve metal foils 12b of the capacitor units 1b and a negative guiding substrate 22b electrically connected to the carbon glue layers 10b of the capacitor units 1b. In addition, the package unit 3b covers the capacitor units 1b and one part of the substrate unit 2b.

Figure 3:
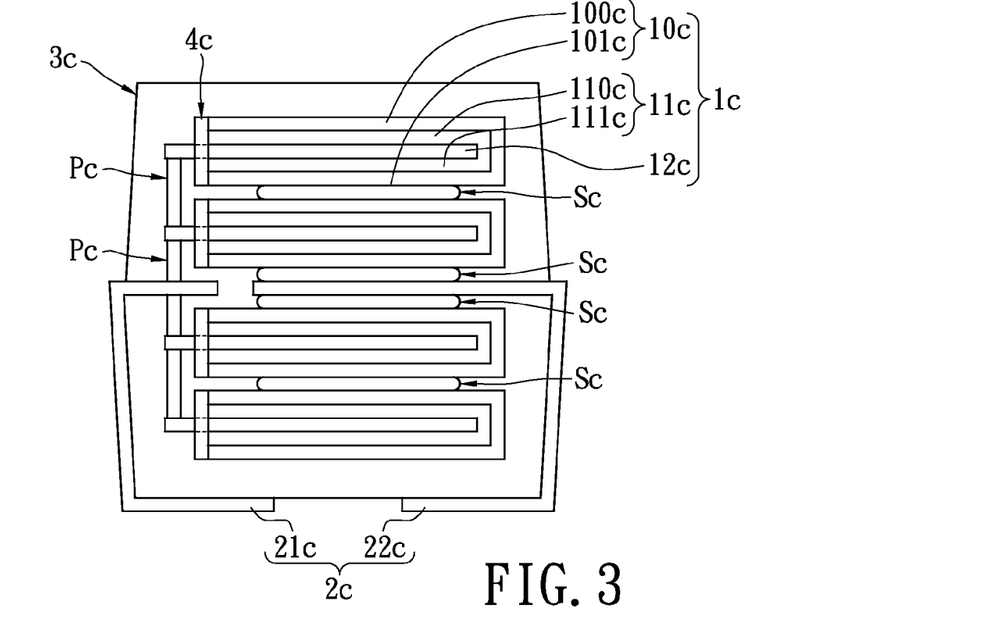
FIG. 3 is a lateral, schematic view of the stacked solid electrolytic capacitor according to the third embodiment of the present invention.

Referring to FIG. 3, the third embodiment of the present invention provides a stacked solid electrolytic capacitor (chip capacitor) with multi-pin structure, including: a plurality of capacitor units 1c, a substrate unit 2c and a package unit 3c. Every two capacitor units 1c are electrically stacked onto each other by a conductive layer Sc such as silver glue or silver paste.

Each capacitor unit 1c is composed of a negative foil (negative electrode) 100c, an isolation paper 110c with conductive polymer substance, a positive foil (positive electrode) 12c, an isolation paper 111c with conductive polymer substance and a negative foil (negative electrode) 101c that are alternatively stacked onto each other. Each positive foil 12c has an oxide layer (not shown) on its outer surface, and the oxide layer can be a dielectric layer to generate insulation effect. The two isolation paper (110c, 101c) of each capacitor unit 1c are integrated to form a U-shaped isolation paper 11c in order to cover one part of the positive foils 12c of each capacitor unit 1c, and the two negative foils (100c, 101c) of each capacitor unit 1c are integrated to form a U-shaped negative foil 10c in order to cover the U-shaped isolation paper 11c of each capacitor unit 1c.

Moreover, the positive electrodes of the positive foils 12c of the capacitor units 1c are electrically connected to each other by soldering Pc. The two negative foils (100c, 101c) of each capacitor unit 1c are electrically connected to each other, and the positive foils 12c and the two negative foils (100c, 101c) are insulated from each other. In addition, each capacitor unit 1c has a plurality of insulating layers 4c, and each insulating layer 4c is disposed around one part of an external surface of each positive foil 12c in order to limit the lengths of the negative foils (100c, 101c) and the isolation paper (110c, 111c). In other words, each insulating layer 4c is disposed around one part of a top, a bottom, a left and a right surfaces of each positive foil 12c. Each insulating layer 4c can be an insulating line between the positive electrode and the negative electrode of the each capacitor unit 1c.

Furthermore, the substrate unit 2c has a positive guiding substrate 21c electrically connected to the positive foils 12c of the capacitor units 1c and a negative guiding substrate 22c electrically connected to the negative foils (100c, 101c) of the capacitor units 1c. The substrate unit 2c can be disposed a center position (as shown in FIG. 3), a bottom position or any position of the capacitor units 1c. In addition, the package unit 3c covers the capacitor units 1c and one part of the substrate unit 2c. In other words, one part of the positive guiding substrate 21c and one part of the negative guiding substrate 22c are exposed and bent downwards to form two conductive pins.

Figure 4:
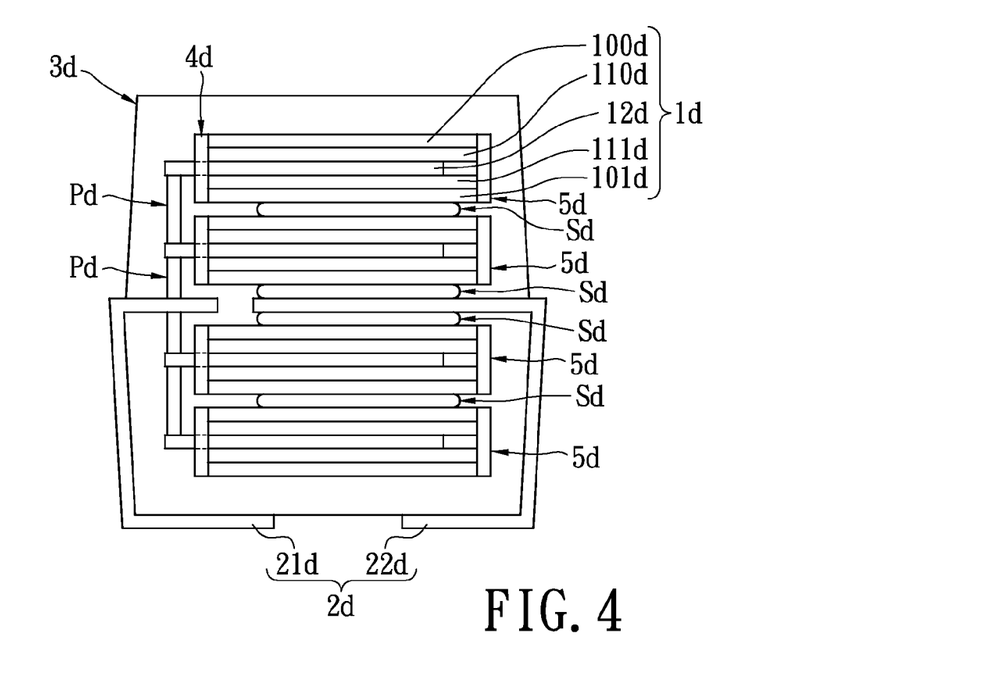
FIG. 4 is a lateral, schematic view of the stacked solid electrolytic capacitor according to the fourth embodiment of the present invention.

Referring to FIG. 4, the fourth embodiment of the present invention provides a stacked solid electrolytic capacitor (chip capacitor) with multi-pin structure, including: a plurality of capacitor units 1d, a substrate unit 2d and a package unit 3d. Every two capacitor units 1d are electrically stacked onto each other by a conductive layer Sd such as silver glue or silver paste.

Each capacitor unit 1d is composed of a negative foils (negative electrodes) 100d, an isolation paper 110d with conductive polymer substance, a positive foils (positive electrodes) 12d, an isolation paper 111d with conductive polymer substance and a negative foils (negative electrodes) 101d that are stacked onto each other. Each positive foil 12d has an oxide layer (not shown) on its outer surface, and the oxide layer can be a dielectric layer to generate insulation effect. In addition, the fourth embodiment further includes a plurality of conductive layers 5d. Each conductive layer 5d is electrically connected between the two negative foils (100d, 101d) of each capacitor unit 1d, and the lengths of two same ends of two negative foils (100d, 101d) of each capacitor unit 1d are larger than the length of one end of the positive foil 12d of each capacitor unit 1d in order to prevent the positive foils 12d touching the conductive layers 5d.

Moreover, the positive electrodes of the positive foils 12d of the capacitor units 1d are electrically connected to each other by soldering Pd. The two negative foils (100d, 101d) of each capacitor unit 1d are electrically connected to each other by the conductive layers 5d, and the positive foils 12d and the two negative foils (100d, 101d) are insulated from each other. In addition, each capacitor unit 1d has a plurality of insulating layers 4d, and each insulating layer 4d is disposed around one part of an external surface of each positive foil 12d in order to limit the lengths of the negative foils (100d, 101d) and the isolation paper (110d, 111d). In other words, each insulating layer 4d is disposed around one part of a top, a bottom, a left and a right surfaces of each positive foil 12d. Each insulating layer 4d can be an insulating line between the positive electrode and the negative electrode of the each capacitor unit 1d.

Furthermore, the substrate unit 2d has a positive guiding substrate 21d electrically connected to the positive foils 12d of the capacitor units 1d and a negative guiding substrate 22d electrically connected to the negative foils (100d, 101d) of the capacitor units 1d. In addition, the package unit 3d covers the capacitor units 1d and one part of the substrate unit 2d.

Figure 5:
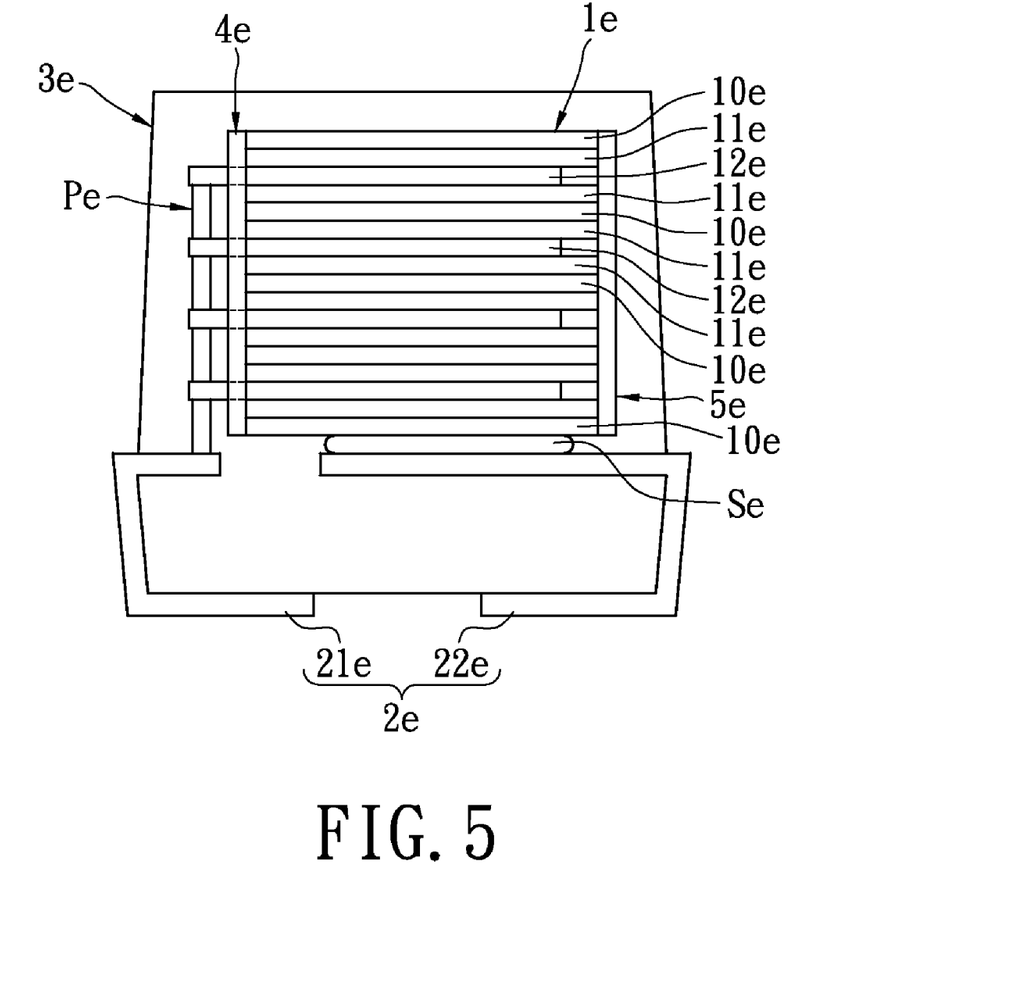
FIG. 5 is a lateral, schematic view of the stacked solid electrolytic capacitor according to the fifth embodiment of the present invention.
Figure 5A:
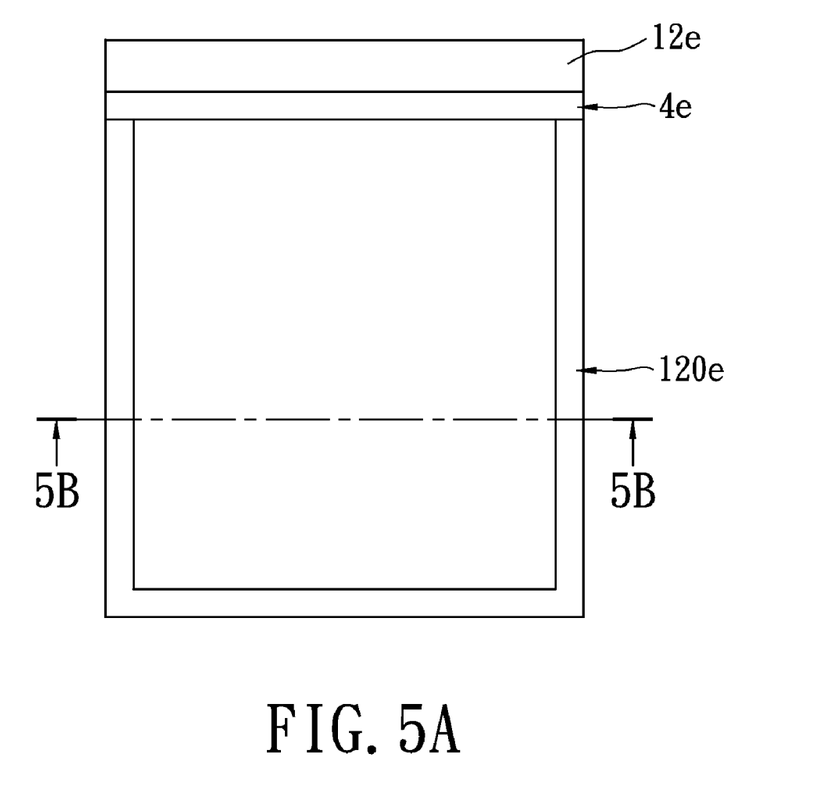
FIG. 5A is a top, schematic view of the resin body installed on an edge of the positive foil according to the fifth embodiment of the present invention.
Figure 5B:
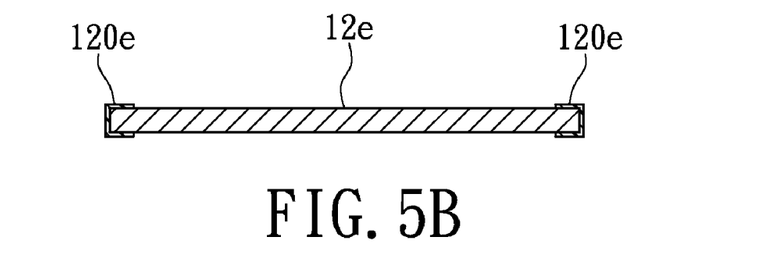
FIG. 5B is an exploded, schematic view along line 5B-5B of FIG. 5A.

Referring to FIGS. 5, 5A and 5B, the fifth embodiment of the present invention provides a stacked solid electrolytic capacitor (chip capacitor) with multi-pin structure, including: a capacitor unit 1e, a substrate unit 2e and a package unit 3e.

The capacitor unit 1e is composed of a plurality of negative foils (negative electrodes) 10e, a plurality of isolation paper 11e with conductive polymer substance and a plurality of positive foils (positive electrodes) 12e that are alternatively stacked onto each other. Each isolation paper 11e is disposed between each positive foil 12e and each negative foil 10e. The positive sides of the positive foils 12e are electrically connected to each other by soldering Pe, the negative foils 10e are electrically connected to each other by a conductive layer 5e, and the positive foils 12e and the negative foils 10e are insulated from each other. In addition, each positive foil 12e has a resin body 120e (as shown in FIGS. 5A and 5B) selectively installed on an edge thereof, and each negative foil 10e also has a resin body (not shown) selectively installed on an edge thereof, in order to decrease the LC (Leakage Current) and the phenomenon of the short circuit. Of course, the resin body can be selectively installed on an edge of each positive foil and each negative foil or the negative electrode side of each valve metal foil in the other embodiments of the present invention.

Furthermore, the substrate unit 2e has a positive guiding substrate 21e electrically connected to the positive foils 12e and a negative guiding substrate 22e electrically connected to the negative foils 10e by the conductive layer Se. In addition, the package unit 3e covers the capacitor units 1e and one part of the substrate unit 2e.

In addition, each capacitor unit 1e has a plurality of insulating layers 4e, and each insulating layer 4e is disposed around one part of an external surface of each positive foil 12e in order to limit the lengths of the negative foils 10e and the isolation paper 11e. In other words, each insulating layer 4e is disposed around one part of a top, a bottom, a left and a right surfaces of each positive foil 12e. Each insulating layer 4e can be an insulating line between the positive electrode and the negative electrode of the each capacitor unit 1e. Moreover, the conductive layer 5e is electrically connected one end of the negative foils 10e, and the length of the end of each negative foil 10e is larger than the length of one end of each positive foil 12e in order to prevent the positive foils 12e touching the conductive layer 5e.

Figure 6:
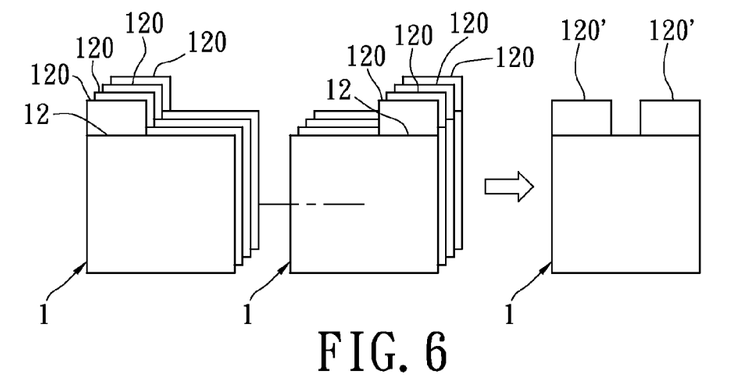
FIG. 6 is a schematic view of the stacked solid electrolytic capacitor using a first stack method according to the present invention.
Figure 7:
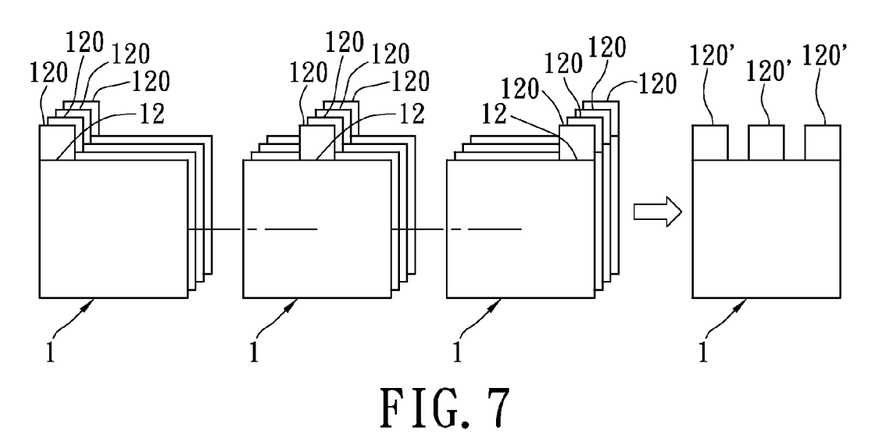
FIG. 7 is a schematic view of the stacked solid electrolytic capacitor using a second stack method according to the present invention.

The above-mentioned embodiments can use the following different aspects:

Referring to FIGS. 6 and 7 (multi positive extending sides along the same direction and one negative extending side), each capacitor unit 1 has a positive electrode 12 that has a positive pin 120 extended outwards therefrom. The positive pins 120 of the capacitor units 1 are divided into a plurality of positive pin units 120' that are separated from each other (FIG. 6 discloses two sets of positive pin units 120', FIG. 7 discloses three sets of positive pin units 120'), and the positive pins 120 of each positive pin unit 120' are electrically stacked onto each other. The positive pins 120 are respectively extended outwards from the positive electrodes 12 along the same direction. Only four layers of soldering can achieve eight layers of stacking as showing in FIG. 6, and only four layers of soldering can achieve twelve layers of stacking as showing in FIG. 7. In addition, the negative electrodes (not shown) of the capacitor units 1 are electrically stacked onto each other by the conductive layers.

Figure 8:
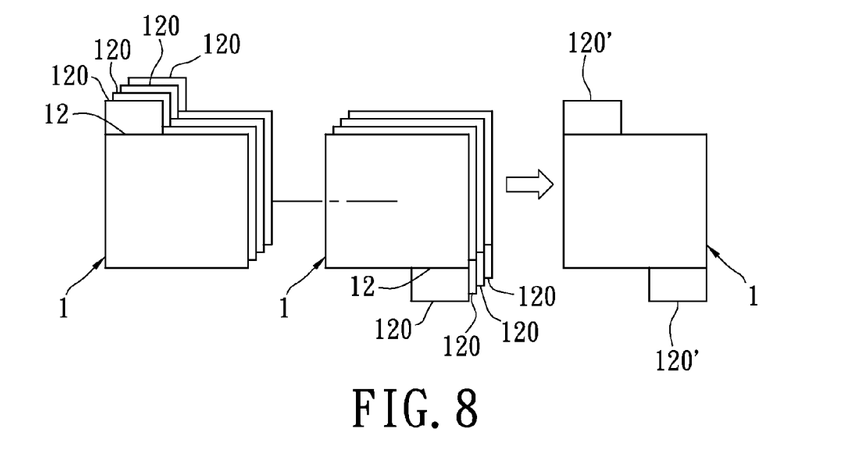
FIG. 8 is a schematic view of the stacked solid electrolytic capacitor using a third stack method according to the present invention.
Figure 9:
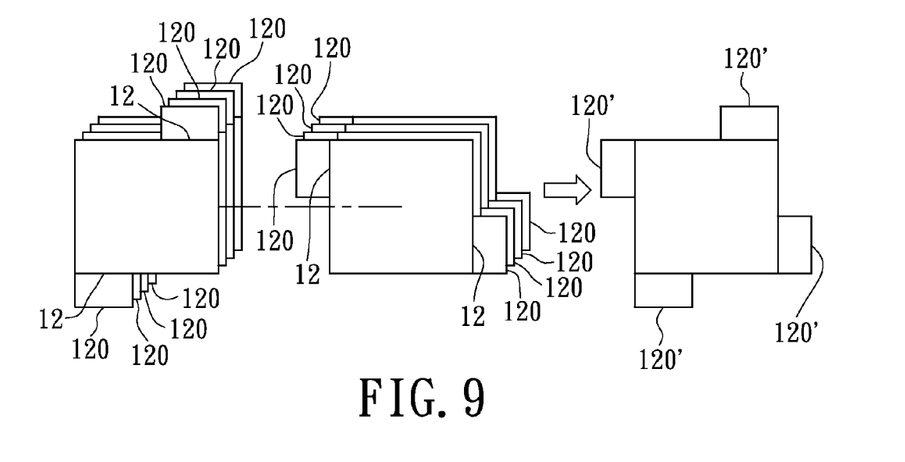
FIG. 9 is a schematic view of the stacked solid electrolytic capacitor using a fourth stack method according to the present invention.

Referring to FIGS. 8 and 9 (multi positive extending sides along different directions and one negative extending side), each capacitor unit 1 has a positive electrode 12 that has a positive pin 120 extended outwards therefrom. The positive pins 120 of the capacitor units 1 are divided into a plurality of positive pin units 120' that are separated from each other (FIG. 8 discloses two sets of positive pin units 120', FIG. 9 discloses four sets of positive pin units 120'), and the positive pins 120 of each positive pin unit 120' are electrically stacked onto each other. The positive pins 120 are respectively extended outwards from the positive electrodes 12 along different directions. In addition, the negative electrodes (not shown) of the capacitor units 1 are electrically stacked onto each other by the conductive layers.

In other words, referring to FIGS. 6-9, the positive foil 12 of each capacitor unit has a positive pin 120 extended outwards therefrom. The positive pins 120 of the capacitor units 1 are divided into a plurality of positive pin units 120' that are separated from each other, and the positive pins 120 of each positive pin unit 120' are electrically stacked onto each other. In addition, the negative electrode (not shown) of each capacitor unit 1 has a negative pin (not shown) extended outwards therefrom, and the negative pins of the capacitor units 1 are combined to form a negative pin unit in order to make the negative pins electrically stacked onto each other. Moreover, the positive pins 120 are selectively respectively extended outwards from the positive electrodes 12 along the same direction (as shown in FIGS. 6-7) or different directions (as shown in FIGS. 8-9), and the negative pins are respectively extended outwards from the negative electrodes along the same direction (it means that the whole negative pins of the negative electrodes are electrically stacked onto each other).

Of course, the positive electrodes can be electrically stacked onto each other and the negative pins (not shown) can be selectively respectively extended outwards from the negative electrodes along the same direction (to form one positive extending side and multi negative extending sides along the same direction) or different directions (to form one positive extending side and multi negative extending sides along different directions). For example, the positive electrode of each capacitor unit has a positive pin extended outwards therefrom, and the positive pins are combined to form a positive pin unit in order to make the positive pins electrically stacked onto each other. The negative electrode of each capacitor unit has a negative pin extended outwards therefrom. The negative pins of the capacitor units are divided into the negative pin units, and the negative pin units are separated from each other and the negative pins of each negative pin unit are electrically stacked onto each other. In addition, the positive pins are respectively extended outwards from the positive electrodes along the same direction, and the negative pins are selectively respectively extended outwards from the negative electrodes along the same direction or different directions.

Figure 10:
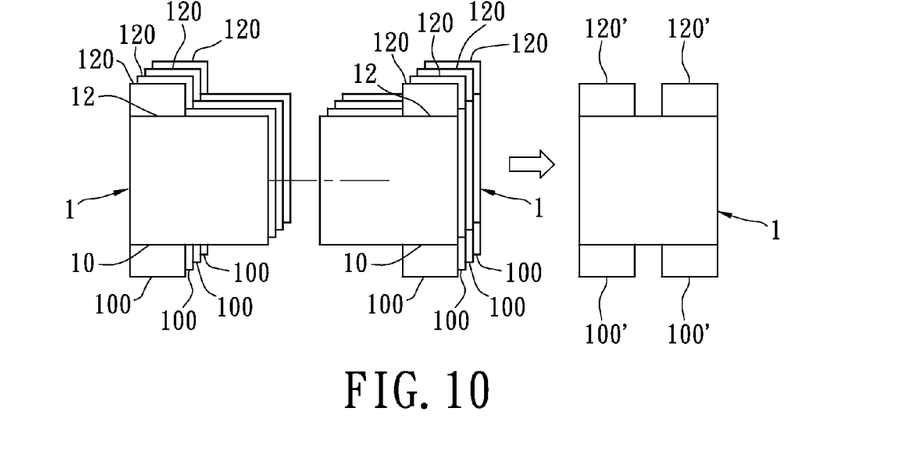
FIG. 10 is a schematic view of the stacked solid electrolytic capacitor using a fifth stack method according to the present invention.
Figure 11:
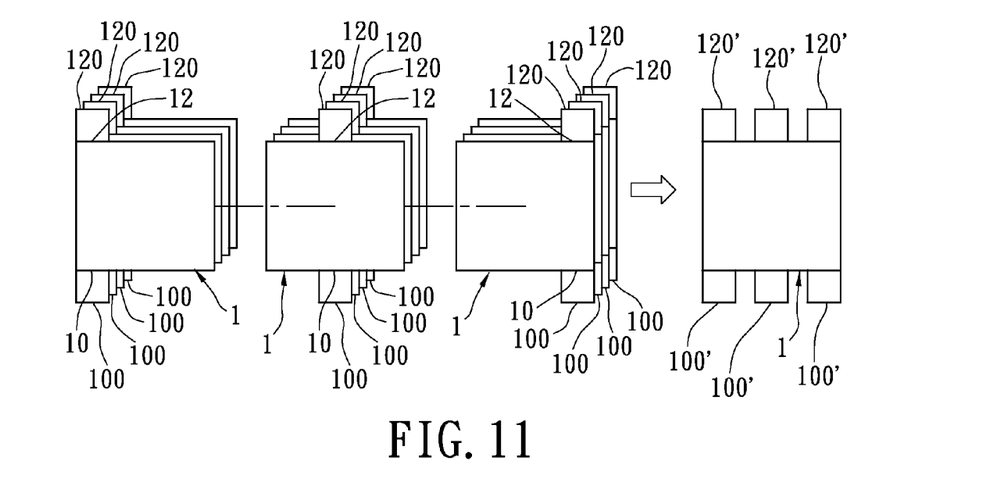
FIG. 11 is a schematic view of the stacked solid electrolytic capacitor using a sixth stack method according to the present invention.

Referring to FIGS. 10 and 11 (multi positive extending sides along the same direction and multi negative extending sides along the same direction), each capacitor unit 1 has a positive electrode 12 that has a positive pin 120 extended outwards therefrom. The positive pins 120 of the capacitor units 1 are divided into a plurality of positive pin units 120' that are separated from each other (FIG. 10 discloses two sets of positive pin units 120', FIG. 11 discloses three sets of positive pin units 120'), and the positive pins 120 of each positive pin unit 120' are electrically stacked onto each other. Each capacitor unit 1 has a negative electrode 10 that has a negative pin 100 extended outwards therefrom. The negative pins 100 of the capacitor units 1 are divided into a plurality of negative pin units 100' that are separated from each other (FIG. 10 discloses two sets of negative pin units 100', FIG. 11 discloses three sets of negative pin units 100'), and the negative pins 100 of each negative pin unit 100' are electrically stacked onto each other. The positive pins 120 are respectively extended outwards from the positive electrodes 12 along the same direction, and the negative pins 100 are respectively extended outwards from the negative electrodes 10 along the same direction. Only four layers of soldering can achieve eight layers of stacking as showing in FIG. 10, and only four layers of soldering can achieve twelve layers of stacking as showing in FIG. 11.

Of course, the aspect of FIGS. 10 and 11 can be changed into multi positive extending sides along different directions and multi negative extending sides along different directions. For example, each capacitor unit 1 has a positive electrode 12 that has a positive pin 120 extended outwards therefrom. The positive pins 120 of the capacitor units 1 are divided into a plurality of positive pin units 120' that are separated from each other, and the positive pins 120 of each positive pin unit 120' are electrically stacked onto each other. Each capacitor unit 1 has a negative electrode 10 that has a negative pin 100 extended outwards therefrom. The negative pins 100 of the capacitor units 1 are divided into a plurality of negative pin units 100' that are separated from each other, and the negative pins 100 of each negative pin unit 100' are electrically stacked onto each other. The positive pins 120 are respectively extended outwards from the positive electrodes 12 along the same direction (as shown in FIGS. 10 and 11) or the different directions, and the negative pins 100 are respectively extended outwards from the negative electrodes 10 along the same direction (as shown in FIGS. 10 and 11) or the different directions.

Therefore, the present invention provides many separate positive pins and/or many separate negative pins. In other words, the present invention can use the separate positive pins and the separate negative pins to execute soldering process (as shown in FIGS. 10 and 11). The present invention also can use the separate positive pins (as shown in FIGS. 6-9) to mate with concentrated negative pins or use the separate negative pins to mate with concentrated positive pins.

The above-mentioned embodiments of the present invention can use the above-mentioned different aspects. For example, the positive electrodes (12a, 12b, 12c, 12d, 12e) of the capacitor units (1a, 1b, 1c, 1d, 1e) are electrically connected to each other and respectively electrically connected to the positive pins 120. The negative electrodes (10a, 10b, 10c, 10d, and 10e) of the capacitor units (1a, 1b, 1c, 1d, 1e) are electrically connected to each other and respectively electrically connected to the negative pins 100.

Hence, user can choose one of the five embodiments to mate with one of the six aspects according to different requirements in order to finish the stacked solid electrolytic capacitor of the present invention.

Figure 12:
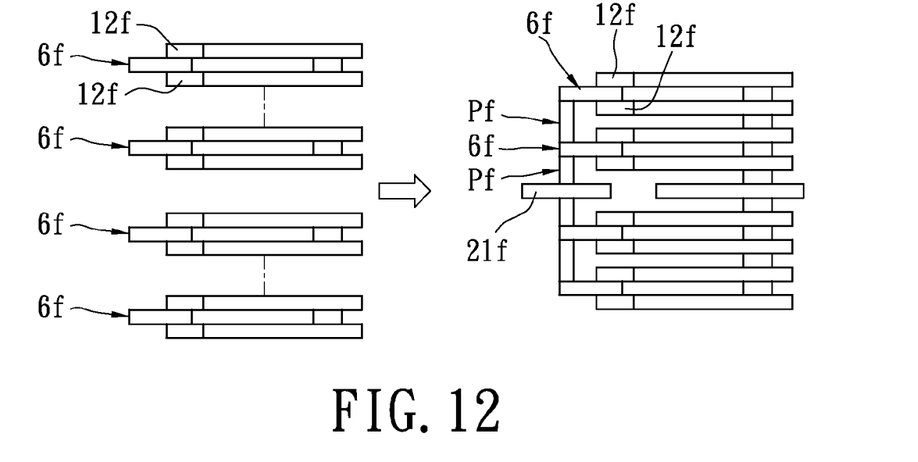
FIG. 12 is a lateral, schematic view of the stacked solid electrolytic capacitor according to the sixth embodiment of the present invention.

Referring to FIG. 12, the sixth embodiment of the present invention provides a plurality of assistance conductive blocks 6f. Each assistance conductive block 6f is electrically disposed between the two positive electrodes 12f of every two capacitor units 1f and extended outwards, and the assistance conductive blocks 6f are electrically connected to the positive guiding substrate 21f by soldering Pf. For example, the positive electrodes 12f are electrically connected to the positive guiding substrate 21f (as shown in FIGS. 1-5) in series by the assistance conductive blocks 6f.

Figure 13:
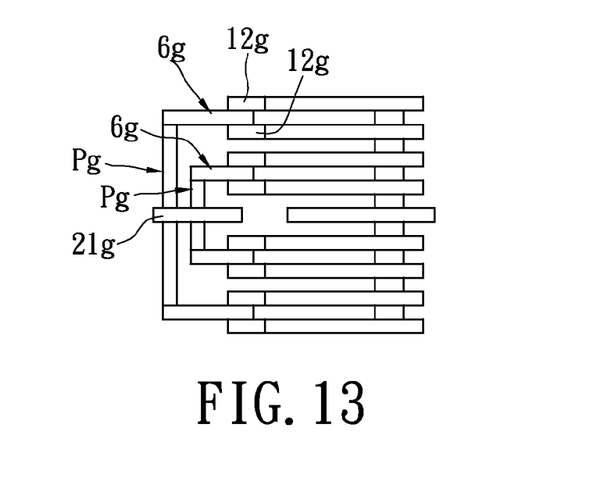
FIG. 13 is a lateral, schematic view of the stacked solid electrolytic capacitor according to the seventh embodiment of the present invention.

Referring to FIG. 13, the seventh embodiment of the present invention provides a plurality of assistance conductive blocks 6g. Each assistance conductive block 6g is electrically disposed between the two positive electrodes 12g of every two capacitor units 1g and extended outwards, and the assistance conductive blocks 6g are electrically connected to the positive guiding substrate 21g by soldering Pg. For example, the positive electrodes 12g are electrically connected to the positive guiding substrate 21g (as shown in FIGS. 6-7) in parallel by the assistance conductive blocks 6g.

In conclusion, the present invention has a plurality of positive pins being extended from the positive electrodes of the capacitor units along the same direction and/or different directions and being electrically stacked onto each other by soldering, so that the soldering difficulty and the ESR (Equivalent Series Resistance) are decreased.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A stacked solid electrolytic capacitor, comprising:
    a substrate unit including a positive guiding substrate and a negative guiding substrate;
    a plurality of first capacitor units and a plurality of second capacitor units, wherein the first capacitor units and the second capacitor units are alternately stacked on top of one another, wherein each first capacitor unit includes a first positive electrode electrically connected to the positive guiding substrate and a first negative electrode electrically connected to the negative guiding substrate, the first positive electrode has a first positive pin extended outwardly along a first predetermined direction, and the first positive pins of the first positive electrodes are alternately stacked on top of one another, wherein each second capacitor unit includes a second positive electrode electrically connected to the positive guiding substrate and a second negative electrode electrically connected to the negative guiding substrate, the second positive electrode has a second positive pin extended outwardly along a second predetermined direction, the second positive pins of the second positive electrodes are alternately stacked on top of one another and separated from the first positive pins of the first positive electrodes, and the first predetermined direction and the second predetermined direction are different directions; and
    a package unit enclosing the first capacitor units, the second capacitor units, one part of the positive guiding substrate and one part of the negative guiding substrate;
    wherein the first negative electrode has a first negative pin extended outwardly along a third predetermined direction, the first negative pins of the first negative electrodes are alternately stacked on top of one another, the second negative electrode has a second negative pin extended outwardly along a fourth predetermined direction, the second negative pins of the second negative electrodes are alternately stacked on top of one another and separated from the first negative pins of the first negative electrodes, and the third predetermined direction and the fourth predetermined direction are different direction.

2. The stacked solid electrolytic capacitor according to claim 1, wherein each first capacitor unit or each second capacitor unit is composed of a carbon glue layer, a conductive polymer layer, a valve metal foil, a conductive polymer layer and a carbon glue layer that are sequentially stacked on top of one another.

3. The stacked solid electrolytic capacitor according to claim 2, wherein each valve metal foil has a resin body installed on an edge of a negative side thereof.

4. The stacked solid electrolytic capacitor according to claim 1, wherein each first capacitor unit or each second capacitor unit is composed of a negative foil, an isolation paper with a conductive polymer substance, a positive foil, an isolation paper with a conductive polymer substance and a negative foil that are sequentially stacked on top of one another.

5. The stacked solid electrolytic capacitor according to claim 4, wherein the positive foil has a resin body installed on an edge thereof, and the negative foil has a resin body installed on an edge thereof.

6. A stacked solid electrolytic capacitor, comprising:
a substrate unit including a positive guiding substrate and a negative guiding substrate;
a plurality of first capacitor units and a plurality of second capacitor units, wherein the first capacitor units and the second capacitor units are alternately stacked on top of one another, wherein each first capacitor unit includes a first positive electrode electrically connected to the positive guiding substrate and a first negative electrode electrically connected to the negative guiding substrate, the first positive electrode has a first positive pin extended outwardly along a first predetermined direction, and the first positive pins of the first positive electrodes are alternately stacked on top of one another, wherein each second capacitor unit includes a second positive electrode electrically connected to the positive guiding substrate and a second negative electrode electrically connected to the negative guiding substrate, the second positive electrode has a second positive pin extended outwardly along a second predetermined direction, the second positive pins of the second positive electrodes are alternately stacked on top of one another and separated from the first positive pins of the first positive electrodes, and the first predetermined direction and the second predetermined direction are different direction; and
a package unit enclosing the first capacitor units, the second capacitor units, one part of the positive guiding substrate and one part of the negative guiding substrate;
wherein the first negative electrode has a first negative pin extended outwardly along a third predetermined direction, the second negative electrode has a second negative pin extended outwardly along a fourth predetermined direction, the third predetermined direction and the fourth predetermined direction are the same direction, and the first negative pins and the second negative pins of the second negative electrodes are alternately stacked on top of one another.

7. The stacked solid electrolytic capacitor according to claim 6, wherein each first capacitor unit or each second capacitor unit is composed of a carbon glue layer, a conductive polymer layer, a valve metal foil, a conductive polymer layer and a carbon glue layer that are sequentially stacked on top of one another.

8. The stacked solid electrolytic capacitor according to claim 7, wherein each valve metal foil has a resin body installed on an edge of a negative side thereof.

9. The stacked solid electrolytic capacitor according to claim 6, wherein each first capacitor unit or each second capacitor unit is composed of a negative foil, an isolation paper with a conductive polymer substance, a positive foil, an isolation paper with a conductive polymer substance and a negative foil that are sequentially stacked on top of one another.

10. The stacked solid electrolytic capacitor according to claim 9, wherein the positive foil has a resin body installed on an edge thereof, and the negative foil has a resin body installed on an edge thereof.

* * * * *